United States Patent [19]

Hart

[11] 4,128,113
[45] Dec. 5, 1978

[54] DOUBLE PLUG SHUTTLE VALVE

[75] Inventor: William A. Hart, Saint Augustine, Fla.

[73] Assignee: The United States of America as represented by the Secretary of the Air Force, Washington, D.C.

[21] Appl. No.: 718,270

[22] Filed: Aug. 27, 1976

[51] Int. Cl.² .......................................... F16K 11/16
[52] U.S. Cl. ........................... 137/627.5; 137/596.2; 137/607; 137/871; 137/636; 251/282
[58] Field of Search ................ 137/596, 596.2, 607, 137/609, 627.5, 636; 91/457; 251/282

[56] References Cited

U.S. PATENT DOCUMENTS

| | | | |
|---|---|---|---|
| 1,653,146 | 12/1927 | Bragg | 91/457 X |
| 1,770,193 | 7/1930 | Bragg | 137/636 |
| 2,671,433 | 3/1954 | Meddock | 137/627.5 |
| 2,783,020 | 2/1957 | Kleczek | 251/282 X |
| 3,332,440 | 7/1967 | Brakebill | 137/627.5 X |
| 3,596,679 | 8/1971 | Sugden | 137/636 |

FOREIGN PATENT DOCUMENTS 1268580  7/1961  France ...................... 137/596.2

Primary Examiner—Robert G. Nilson
Attorney, Agent, or Firm—Joseph E. Rusz; Jacob N. Erlich

[57] ABSTRACT

A double plug shuttle valve having a pair of valve plugs slideably mounted within a hollow body. A tubular actuator operatively connected to the valve plugs permits fluid communication between a central chamber and two end chambers to allow either balanced or unbalanced operation by proper selection of the dimensions of the elements of the valve.

8 Claims, 2 Drawing Figures

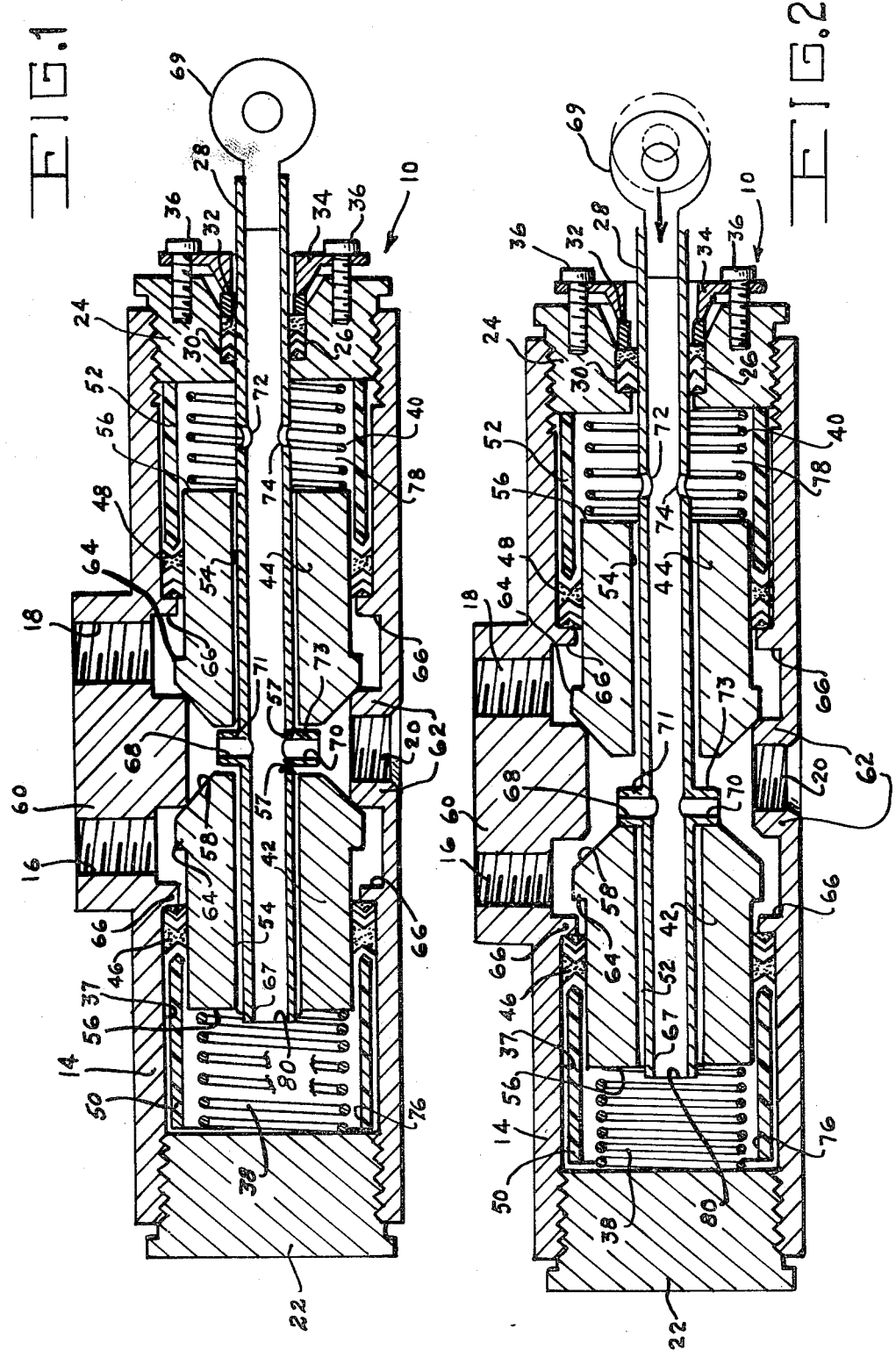

DOUBLE PLUG SHUTTLE VALVE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to valves and more particularly to a double plug shuttle vale.

Valves form an essential element of many of the mechanisms in use today by accurately regulating the flow of fluids such as liquids or gas within the mechanism. In many instances it is necessary to utilize a valve which is not only capable of combining a plurality of fluids but also capable of responding to the fluid pressure associated therewith in order to regulate this flow. Heretofore such valves were operated electrically and utilized a plurality of switches in order to move an actuator to various distinct positions. These electrical valves were extremely complex in construction and although fast acting were also in many instances unreliable due to power shortages or faulty electrical connections.

Mechanical linkages were also used in this type of valves but these linkages were either too slow acting or easily jammed. In addition, pneumatic valves have been utilized and although reliable and fast acting in many instances could not provide accurate valve positioning.

O-ring type spool valves have also been used, however, this type of valve could not be used successfully for long periods of time and with systems carrying high pressure fluids. The reason for this deficiency is that the O-ring mounted on the spool moved past either the inlet or outlet port of the valve and distribution of fluid forces was such that the O-ring was forced against the lip of the port with such force that it became chipped or mutilated. In addition these valves were incapable of properly utilizing the pressure of the fluid associated therewith.

It is therefore clearly evident that improvements in the valve art are extremely necessary.

SUMMARY OF THE INVENTION

The double plug shuttle valve of the instant invention overcomes the problems set forth in detail hereinabove.

This valve is composed of a valve body having a pair of end nuts and a pair of valve plugs and an actuator slideably movable therein. Also located in the body are the fluid inlets and an outlet. The actuator is operatively connected to the valve plugs so as to regulate their movement within the body in order to provide appropriate regulating action for the fluids which flow through the valve. In addition the fluid pressure associated with the valve is used to further regulate the valve action.

With the double plug shuttle valve of this invention it is now capable for a valve to provide a reliable, positive shut-off and to be used with a gas as well as a liquid. In addition "tapered" throttling can be provided by the valve since the valve plug is designed to provide any desired taper for the valves throttling characteristics. The double plug shuttle valve of the invention also utilizes non-metallic seals therein thereby achieving low leakage and a precise fit between the moving parts and the cylindrical bore of the body. Furthermore the valve is insensitive to wear and contamination because soft seals are used. Other than the gross blockage of passages the only mode failure due to contamination would be the scoring of the valve trim.

The valve of the instant invention is also capable of balanced or unbalanced usage and by the proper selection of the ratios of diameters of valve plugs and the strength of springs associated therewith the valve can be either made to operate in a balanced or unbalanced mode by the pressure of the working fluid.

It is therefore an object of this invention to provide a double plug shuttle valve which allows for positive control thereof.

It is another object of this invention to provide a double plug shuttle valve which allows for "tapered" valve throttling.

It is a further object of this invention to provide a double plug shuttle valve which can be operated in either the balanced or unbalanced mode.

It is still a further object of this invention to provide a double plug shuttle valve which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DESCRIPTION OF THE DRAWINGS

FIG. 1 is a side elevational view, shown partly in cross section, of the double plug shuttle valve of this invention in the closed position; and FIG. 2 is a side elevational view, shown partly in cross section, of the double plug shuttle valve of this invention wherein one of the valve plugs is moved to the open position to allow for passage of fluid flow through the valve.

DETAILED DESCRIPTION OF THE PREFERRED EMBODIMENT

Reference is now made to FIG. 1 of the drawing which shows the double plug shuttle valve 10 of this invention in the closed position. Valve 10 is made of a body 14 which contains therein at least three apertures 16, 18 and 20. Under normal operating conditions apertures 16 and 18 form inlet apertures while aperture 20 is the outlet. It should be noted, however, that in some instances aperture 20 may be considered the inlet and apertures 16 and 18 the outlets. Body 14 is made of any suitable material such as metal and preferably of a cylindrical configuration has a closed end nut 22 at one end thereof and an end nut 24 at the other end thereof. End nut 24 has a centrally located opeing 26 therein for receiving an actuator 28 in a manner to be described in detail hereinbelow.

Located within opening 26 of end nut 24 is a conventional vee ring packing assembly 20 made of any suitable sealing material such as neoprene and packing follower 32 thereby forming a seal with actuator 28. Fixedly securing packing assembly 30 and follower 32 in place is any suitable jam nut 34. Jam nut 34 is positioned against follower 32 and secured to end nut 24 by any conventional securing means such as screws 36.

Located within the interior cylindrical bore 37 of body 14 and adjacent end nuts 22 and 24 are a pair of springs 38 and 40, a pair of valve plugs 42 and 44 and conventional valve ring packing assemblies 46 and 48 and packing followers 50 and 52. In addition to the above elements, actuator 28 is also slidably received within bore 37.

Each valve plug 42 and 44 is preferably of a cylindrical configuration having a central, longitudinal opening 54 therein which accepts, in a manner to be described in detail hereinbelow, actuator 28. Each valve plug 42 and 44 is flat at one end 56 thereof and these ends 56 abut, respectively, springs 38 and 40. The other end 57 of each valve plugs 42 and 44 is of a tapered configuration 58 which matingly engages the bevelled edge of outstanding portions 60 and 62 of body 14. Portions 60 and 62 encompass each of the apertures 16, 18 and 20, respectively. In addition, an extension 64 is formed on valve plugs 42 and 44 adjacent tapered segments 58 so as to engage an abutment 66 located within body 14 and thereby limit the movement of valve plugs 42 and 44.

Actuator 28 is of a tubular or hollow configuration having an opening 67 at one end thereof and an actuator plug 69 at the other end thereof. Plug 69 being capable of connection to any other desired actuator (not shown). Also formed within actuator 28 are a pair of main outlets 68 and 70. Outlets 68 and 70 are formed within extensions 71 and 73, respectively, located on actuator 28 and positioned between the tapered ends 57 of valve plugs 42 and 44 thereby enabling valve plugs 42 and 44 to be moved to the open position (note FIG. 2) upon the movement of actuator 28. In addition to outlets 68 and 70 a pair of secondary outlets 72 and 74 are located in actuator 28 within a section or chamber 78 of body 14 containing spring 40. Outlets 72 and 74 and opening 67 of actuator 28 allow fluid to be passed between apertures 16, 18 and 20 as well as within chambers 76 and 78. The relative size and dimension of the various components of valve 10 of this invention as well as the strength of springs 38 and 40 can be altered within the scope of this invention permitting the action of valve plugs 42 and 44 to also correspond to a change of fluid pressure acting thereon.

Reference is now made to FIGS. 1 and 2 in order to best show the operation of valve 10. When it is necessary to pass fluid through valve 10 actuator 28 can be moved to the left, for example, as shown in FIG. 2 of the drawing. In so doing extensions 71 and 73 will abut end 57 of valve plug 42 thereby moving it against the force of spring 38 and to a position in which fluid will pass through inlet 16, through opening 68, 70, 67, 72 and 74 of actuator 28 into chambers 76 and 78 and eventually through outlet 20 or body 14. The position of valve plugs 42 and 44 can thereby be easily regulated by not only the action of actuator 28 but also by the force of springs 38 and 40 and by the fluid pressure within chambers 76 and 78. This pressure being exerted on end 56 of valve plugs 42 and 44.

If actuator 28 is moved to the right (not shown) aperture 16 will be closed and aperture 18 opened. In this manner fluid can be passed through aperture 18 and onto outlet 20. It is also possible with the double plug shuttle valve of this invention to pass fluid through aperture 20 and onto apertures 16 and 18 if the connection of valve 10 to an inlet is reversed.

Although the invention has been described with reference to a particular embodiment, it will be understood to those skilled in the art that the invention is also capable of a variety of alternative embodiments within the spirit and scope of the appended claims.

I claim:

1. A double plug shuttle valve comprising a body, said body having a hollow interior and being closed at one end thereof and having a centrally located opening at the other end thereof, a pair of valve plugs being slidably mounted within said interior of said body, each of said valve plugs having a centrally located longitudinal opening therein, means for biasing one of said valve plugs located in a first chamber formed within said interior of said body between said one end of said body and one of said valve plugs and means for biasing the other of said valve plugs being located in a second chamber formed within said interior of said body between said other end of said body and the other of said valve plugs, each of said valve plugs having a tapered end, at least three apertures located with said body adjacent said tapered ends of said valve plugs, one said apertures being spaced circumferentially a predetermined distance from said other two apertures in said body and said other two apertures in said body being spaced a predetermined distance longitudinally from each other, outstanding portions formed on said body adjacent said apertures for engaging said tapered ends of said valve plugs and an actuator passing through said centrally located openings in said valve plugs and being slidably mounted within said central opening at the other end of said body, said actuator being hollow, having an opening at one end thereof and being closed at the other end thereof, a pair of extensions protrude from said actuator intermediate the ends thereof, each of said extensions having an outlet therein and another pair of outlets located within said actuator between said extensions and said closed end of said actuator whereby upon the movement of said actuator said valve plugs are displaced accordingly thereby allowing for the systematic flow of fluid between said apertures.

2. A double plug shuttle valve as defined in claim 1 wherein said extensions are located between said pair of valve plugs and are capable of engaging said tapered ends of said valve plugs.

3. A double plug shuttle valve as defined in claim 2 further comprising seals interposed between said body and said valve plugs to allow slidable movement of said valve plugs to take place with respect to said body.

4. A double plug shuttle valve as defined in claim 3 wherein said outlet associated with one of said extensions on said actuator is located intermediate two of said aperatures located in said body and said outlet associated with the other of said extensions on said actuator is located adjacent said third aperature located in said body.

5. A double plug shuttle valve as defined in claim 4 wherein said open end of said actuator is located within said first chamber of said body.

6. A double plug shuttle valve as defined in claim 5 wherein said other pair of outlets on said actuator are located within said second chamber of said body.

7. A double plug shuttle valve as defined in claim 6 wherein said biasing means are springs.

8. A double plug shuttle valve as defined in claim 7 further comprising a seal located within said central opening at the other end of said body adjacent said actuator.

* * * * *